United States Patent [19]
Derby

[11] 3,735,237
[45] May 22, 1973

[54] CYCLE CONVERTER POWER SUPPLY FOR MICROWAVE HEATING

[75] Inventor: Palmer P. Derby, Weston, Mass.

[73] Assignee: Raytheon Company, Lexington, Mass.

[22] Filed: Sept. 1, 1971

[21] Appl. No.: 177,026

[52] U.S. Cl. ............321/6, 219/10.55, 321/60, 321/66, 321/68, 328/262
[51] Int. Cl. ..............................................H02m 7/00
[58] Field of Search.......................321/4, 6, 60, 66, 321/68, 69; 328/262; 329/166, 204; 219/10.55

[56] References Cited
UNITED STATES PATENTS

| | | | |
|---|---|---|---|
| 3,538,417 | 11/1970 | Nijhof et al. | 321/6 |
| 3,396,342 | 8/1968 | Feinberg | 328/262 |
| 2,219,200 | 10/1940 | Schmidt | 321/66 |
| 2,179,366 | 11/1939 | Willis | 321/66 X |
| 3,582,756 | 6/1971 | McMurray | 321/66 X |

FOREIGN PATENTS OR APPLICATIONS 199,979    9/1967    U.S.S.R. ..............................321/69 R

*Primary Examiner*—William H. Beha, Jr.
*Attorney*—Milton D. Bartlett, Joseph D. Pannone and Herbert W. Arnold et al.

[57] ABSTRACT

A cycle converter power supply circuit comprising four silicon controlled rectifiers (SCR's), electronic semiconductor switches, used to program current flow through four separate legs of a transformer in a manner to produce an alternating current at a frequency considerably in excess of the prime power. A bridge rectifier circuit in the secondary of the transformer permits the power to be converted to a direct current flow similar in character to what would be achieved through rectification of the prime power. Since the voltage conversion is accomplished at a higher frequency than the prime power, the core area of the transformer can be reduced roughly by the square root of the switching frequency.

17 Claims, 6 Drawing Figures

Patented May 22, 1973 3,735,237

W₁-W₅ ARE ON
COMMON CORE

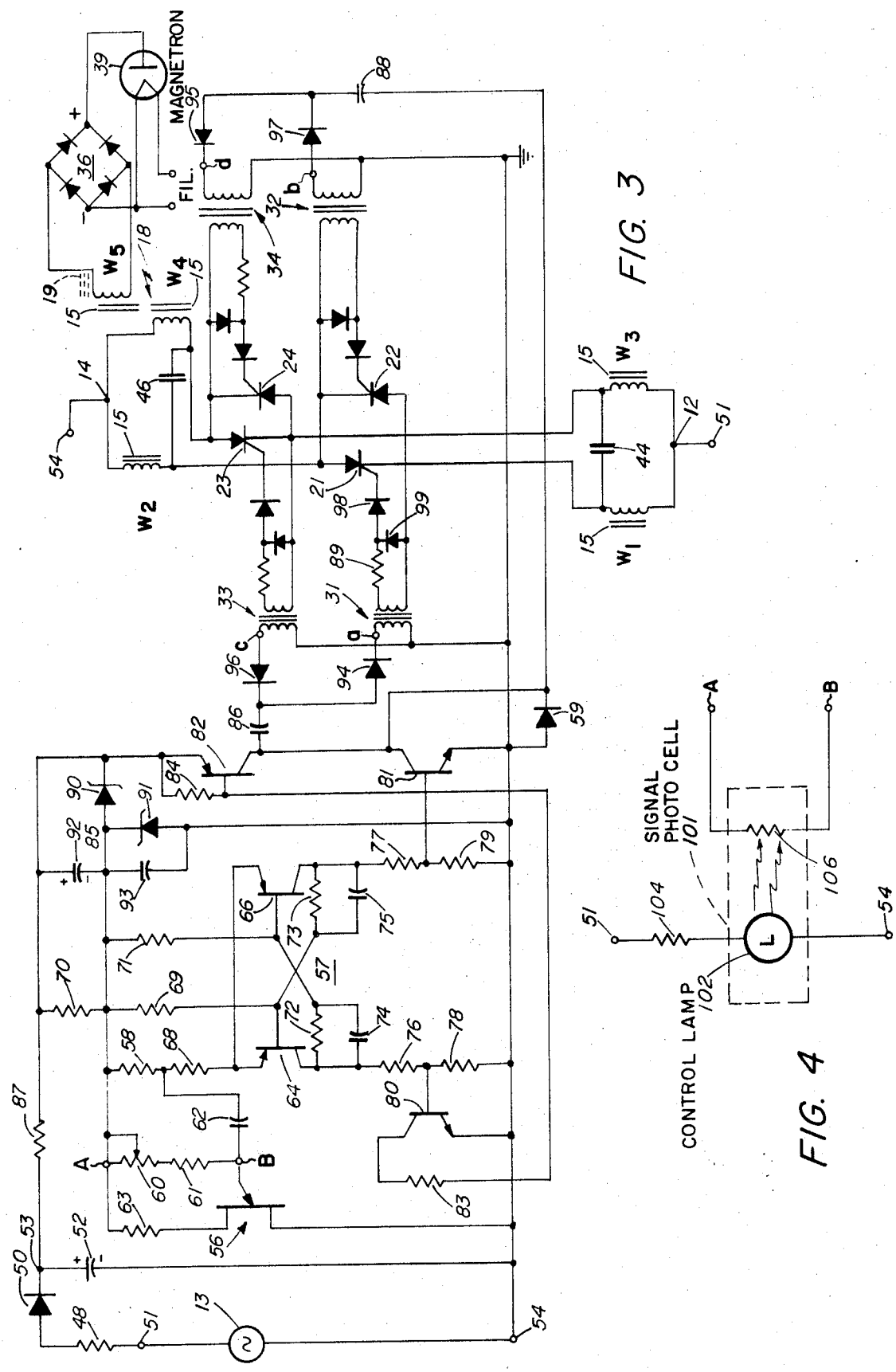

CYCLE CONVERTER POWER SUPPLY FOR MICROWAVE HEATING

BACKGROUND OF THE INVENTION

This invention relates to converter power supplies of the type which convert alternating current power into pulsed direct current power primarily for use with microwave devices such as magnetrons in heating applications. More particularly, the invention relates to a cyclic converter system which utilizes switching devices to transform alternating current power at one frequency into such power at a higher frequency and to the control of the frequency of such power prior to its rectification.

In many power supply applications such as in the energizing of microwave devices such as magnetrons or battery chargers, the basic function of the power supply generally is to develop from a typical alternating current power line a voltage with constant polarity. This is usually accomplished with a transformer and a rectifier circuit. The cost of this type of supply is related directly to the power handled and the voltage transformation required since these factors determine directly the size of the power transformer. In commercial applications transformers which operate at the low prime power frequency, of necessity, generally tend to become heavy and unwieldy whenever it becomes necessary to supply relatively heavy loads associated with microwave heating for applications such as cooking or drying. As is known, considerably reduction in size can be achieved when higher frequency alternating current is utilized. Since the prime power frequency is usually fixed, to pursue such an approach, some type of cycle or frequency converter is necessary. However, for microwave heating and cooking applications which as used with rectified prime power sources generally utilize a magnetron of the continuous wave type it is frequently advantageous to provide a wave which closely approximates the usual waveform resulting from rectification of the prime power source.

It is therefore an object of the invention to provide an improved power supply of the character described, which utilizes higher alternating frequencies than the prime power frequency in order to achieve a reduction in transformer component size and cost of the power supply and at the same time to provide unidirectional power having characteristics approximating those achieved by rectification of the prime power source and are thus suited for supplying power to a magnetron.

From significant advances made in the semiconductor industry, it is now possible to utilize circuits which take the basic input power and, through appropriate switching action, develop high frequency components of generally lighter weight than previously considered possible. Accordingly, a further object of the invention is to provide a novel and improved circuit which utilizes switching devices, preferably of the semiconductor type, which permit conversion of power at a frequency substantially higher than that of the prime power, thus resulting in a reduction in the weight of the power transformer and related components.

SUMMARY OF THE INVENTION

In accordance with the frequency converter circuit of the present invention, power at a higher frequency than the prime power is generated by using four switches, such as electronic semiconductor switches, in four primary windings of a transformer, the conduction and nonconduction of the switches being programmed by a separate source of gate or switching pulse signals to provide in the secondary winding of the transformer a voltage wave resembling a high frequency square wave having a modulation envelope of a period equivalent to the prime power frequency. Rectification of this wave is provided by a bridge rectifier circuit which permits the power to be converted to a direct current flow similar in character to that achieved through rectification of the prime power. In order to render the semiconductor switches nonconducting on alternate half-cycles, the present embodiment discloses capacitors which become charged during conduction of a first semiconductor switch, and upon conduction of another semiconductor switch applies a voltage across first semiconductor switch of a polarity to render the first switch nonconducting. The rate at which the frequency is converted depends upon the frequency of the switching pulse source and the resultant constant polarity rectified output voltage is suitable to supply microwave generator applications. Since the voltage conversion is accomplished at a higher frequency than that of the prime power, the core area of the transformer can be reduced roughly by the square root of the switching frequency. This provides a reduction of component size and weight, highly desirable in microwave heating oven applications, particularly for domestic use.

In its broader aspects, the invention contemplates a cycle converter using switching devices in a plurality of separate primary windings of a transformer which interrupt the prime power in a manner such that the interrupted higher frequency output is, upon rectification, a unipolar wave which resembles the rectified prime power and is particularly suited for use with a magnetron of the type generally used in a domestic microwave oven. In another embodiment the invention discloses the feature of sensing the input voltage or the load current to generate a control signal which varies the conduction frequency of the semiconductor switches to regulate the converter's output and an appropriate amount of leakage inductance can be added to the power transformer in a well-known manner to render it frequency sensitive, so that the power delivered to the load is held substantially constant with variations in input voltage or prime source conditions.

BRIEF DESCRIPTION OF THE DRAWINGS

For a better understanding of the present invention, together with other and further objects thereof, reference is made to the accompanying drawings in which:

FIG. 3 is a schematic circuit diagram of a gate pulse generator used for switching the silicon controlled rectifiers of FIG. 1; and FIG. 4 is a schematic diagram of a frequency control circuit for use in connection with the unijunction oscillator of FIG. 3.

DESCRIPTION OF THE PREFERRED EMBODIMENT

Figure 1:
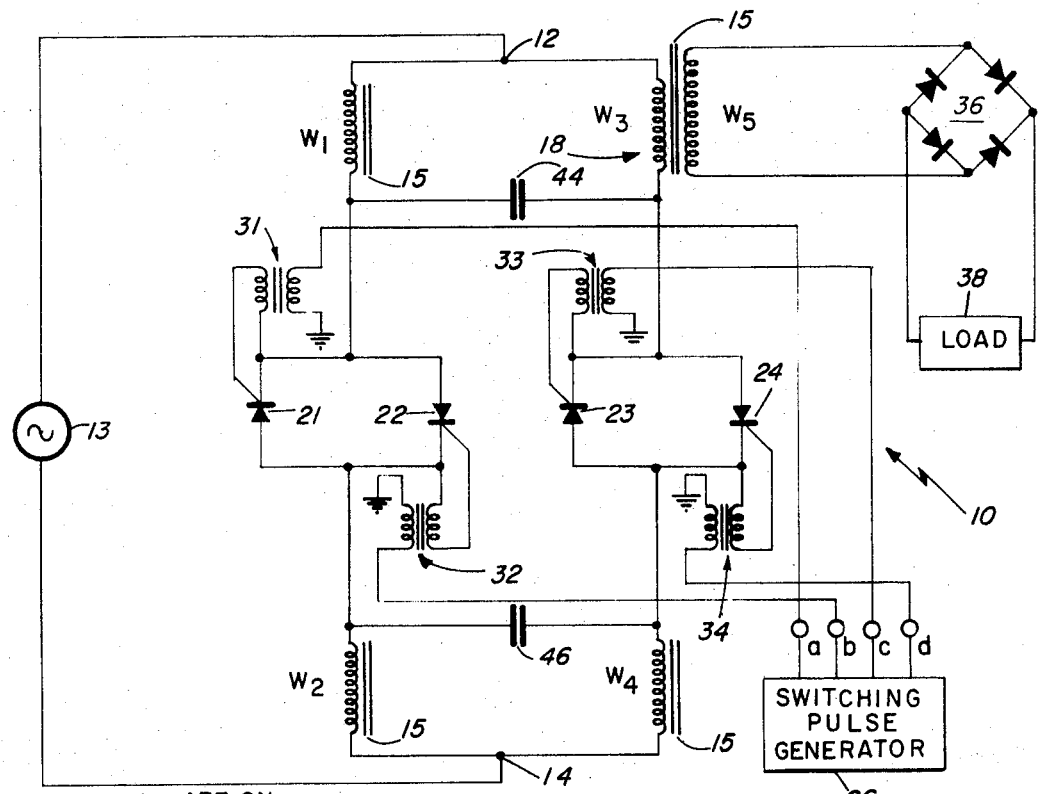
FIG. 1 is a schematic diagram of a power supply circuit embodying features of the invention.
Figure 2A:
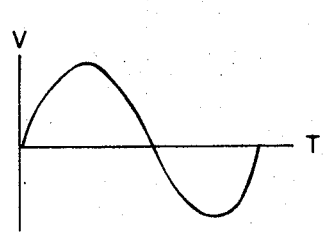
FIGS. 2A, 2B and 2C are curves showing the characteristics of the prime power source in voltage amplitude versus time, the high frequency waveform in the secondary of the transformer and the rectified output voltage.

Referring now to FIG. 1, there is shown a frequency converter circuit 10 having a pair of input terminals or nodes 12 and 14 adapted to receive a low-frequency current source of approximately 60 cycles, such as shown in FIG. 2A and provided by generator or source 13. Connected to terminals 12 and 14, respectively, are primary windings $W_1$, $W_3$ and $W_2$ and $W_4$ which with secondary winding $W_5$ are wound on a common magnetic core 15 and are thus magnetically coupled to form a conventional step-up transformer 18. This transformer steps up the voltage to a value as required by the load. To program the current from low-frequency source 13 through the primary windings four silicon controlled rectifiers are used, for convenience, herein referred to as SCR's. These SCR's can be, for example, type 2N3658. In particular, SCR 21 and SCR 22 are connected in series with windings $W_1$ and $W_2$ across terminals 12 and 14, and SCR 23 and SCR 24 are connected in series with windings $W_3$ and $W_4$, also across terminals 12 and 14. In order to provide a voltage conversion at a higher frequency than that of the prime power source 13, gating pulses at discrete intervals are applied from a conventional gate or switching pulse generator 26 to the control electrode of each silicon controlled rectifier. For each half-cycle of input voltage, the SCR's, for illustrative purposes in the present embodiment, are pulsed to conduct four times the source frequency, although greater reduction in transformer size is achieved at higher frequencies, such as several kilohertz. The switching voltage for SCR 21, for example, is applied between its cathode and control electrode by means of a conventional isolation transformer 31 and an individual output $a$ on switching pulse generator 26. In like manner, silicon controlled rectifiers 22, 23 and 24, respectively, are gated into conduction by gating pulses from respective outputs $b$, $c$ and $d$ of pulse generator 26 by way of isolation transformers 32, 33 and 34, respectively. It should be understood a pair of isolation transformers having separate secondary windings can be used or other winding arrangements can be used to provide isolation in a well-known manner. In order to convert the high frequency current output from the secondary $W_5$ of the transformer into rectified direct current, a conventional bridge rectifier 36 is used, the output of which is connected to a load 38, such as a microwave heating source in the form of a magnetron or other high frequency source. In order to switch off the silicon controlled rectifiers at the proper times, as will be described, capacitors 44 and 46 become charged and then are effectively connected in series first across SCR 21 and SCR 23 then across SCR 22 and SCR 24. The silicon controlled rectifiers in the present instance are preferably of a high frequency, heavy duty type and capacitors 44 and 46 are, in this embodiment, preferably 3.0 microfarad.

Figure 2B:
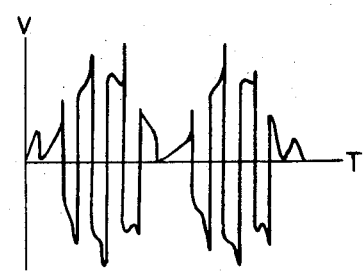
Figure 2C:
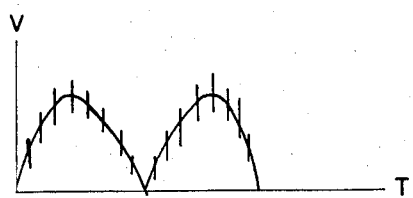

In operation, it is assumed that the phase of the voltage from alternating current source 13 is such that terminal 14 is positive with respect to terminal 12 and that SCR 21 has received a switching pulse from gate pulse generator 26 and is in the conducting state; that is, as a switch it is closed. Under these conditions, current flows through windings $W_1$ and $W_2$ causing a positive voltage excursion on winding $W_5$ as illustrated in FIG. 2B. Capacitor 44 then charges up to the voltage drop across winding $W_1$, since, by means of winding $W_3$, it is effectively connected across winding $W_1$. It should be understood at this point in the operating sequence, SCR 23 is not yet conducting, and SCR 22 and SCR 24 are poled so as to be inoperative until the phase of the current at terminals 12 and 14 is reversed. Accordingly, while condenser 44 charges up to the voltage drop across winding $W_1$, condenser 46 in like manner, charges by way of winding $W_4$ to the voltage drop across winding $W_2$. When SCR 23 is gated into conduction by its gate pulse from generator 26, condensers 44 and 46 are effectively coupled in series and discharge through SCR 21 causing this SCR to switch off. Conduction of SCR 23 also causes a negative voltage excursion on winding $W_5$ as illustrated in FIG. 2B. When SCR 21 switches off, capacitors 44 and 46 again charge. When SCR 21 again conducts, capacitors 44 and 46 discharge to cut off SCR 23. Then SCR 21 is again rendered nonconducting when SCR 23 is gated into conduction. By continuing to apply gate signals of the proper polarity to SCR 21 and SCR 23, the SCR in the nonconducting mode switches on causing the capacitors to discharge through the conducting SCR to put it in the off state. This process continues with SCR 21 and SCR 23 as long as the applied source voltage retains the same voltage polarity relationship between terminals 12 and 14 as previously described, thus causing a series of positive and negative excursions in winding $W_5$. Thus, when SCR 21 is made to conduct four times for each half-cycle, the 60 cycle input frequency is switched at 480 cycles per second. When the phase of the input voltage changes such that terminal 12 is positive with respect to terminal 14, then SCR 22 and SCR 24 become the switches in the corresponding legs of the primary circuit. In this case, current flows from terminal 12 through the conducting SCR 24 and capacitors 44 and 46 charge in the opposite direction from that during the first half-cycle. This charge on condensers 44 and 46 is due to the voltage drop, respectively, across $W_3$ and $W_4$. When SCR 22 is gated into conduction the capacitors are effectively connected in series across SCR 24 and discharge through SCR 24 to render it nonconducting. This process continues to produce the same number of pulses for this half-cycle as on the previous half-cycle, as shown in FIG. 2B. This number is determined by the frequency of the free-running switching pulse generator 26 and is therefore independent of the frequency of the input voltage. The currents switched through the coil windings $W_1$, $W_2$, $W_3$ and $W_4$ generate similar magnetic fluxes in the pair of primary windings $W_1$ and $W_2$ in the so-called first series circuit including back-to-back SCR 21 and SCR 22 and opposite flux is generated in primary windings $W_3$ and $W_4$ of the second series circuit including back-to-back SCR 23 and SCR 24. Windings $W_1$ and $W_2$ are wound to aid each other and oppositely to windings $W_3$ and $W_4$. This arrangement thus produces in the core structure of the transformer a variable flux which generates in the secondary winding $W_5$ a voltage function appearing as a high frequency square wave modulated by a lower frequency voltage function, in this instance, the source or prime line frequency. The voltage function as appearing across the output of $W_5$, as seen in FIG. 2B, resembles an interrupted or modulated sine wave envelope of voltage which is suitable for rectification in full wave rectifier bridge 36. Upon rectification of this output from secondary $W_5$, a resultant rectified direct current is produced, as seen in FIG. 2C, which approximates the characteristic appearance of a full wave rectified input line voltage, such as that of prime source 13. Since the alternating rate of the high frequency pulse or square wave is determined by the frequency of the gating signal, different rates of output current in secondary winding $W_5$ can be achieved simply by changing the frequency of the gating signal. The rectified output of the bridge circuit 36 is thus a waveform resembling that of a rectified prime power source and is thus suitable to be applied to the terminals of a microwave power generator such as a magnetron.

Referring now to FIG. 3 there is shown a complete detailed schematic circuit of the power supply having the form of FIG. 1 and including circuit details of one form of gate or switching pulse generator. In this figure the corresponding parts in FIGS. 1 and 3 bear the same numbers. Since the operation of the circuit of FIG. 3 will thus be clear from the above description of FIG. 1, only the detailed means for providing a series of discrete gating pulses and their connection to the semiconductor switches will be described in detail. In particular, prime source 13, herein shown as 115 volts, 60 cycles, is applied by way of a 51 ohm limiting resistor 48 to a conventional diode rectifier 50 and a 40 microfarad filter capacitor 52. Source 13 is shown herein supplying power to both trigger circuit and transformer 18 by way of terminals 51 and 54 although separate prime power sources can be used, and the usual polarity considerations observed. The rectified direct current voltage at terminals 53 and 54 is applied by way of a load resistor 70 and a zener circuit 85 to a unijunction transistor 56 such as a type 2N1671 which is connected in a well-known manner to operate as a relaxation oscillator. Negative trigger pulses are generated across a 15 ohm output resistor 58 each time the unijunction transistor triggers. The frequency of oscillation can be varied by a 100,000 ohm potentiometer 60 under present circuit values from approximately 20 cycles per second to 600 cycles per second. The trigger timing frequency for the oscillator is determined by an RC circuit comprising the 3,300 ohm limiting resistor 61, the potentiometer 60 and a 0.5 microfarad capacitor 62 which is effectively connected in shunt with potentiometer 60 and resistor 61. Resistor 63 is a 270 ohm current limiting resistor for unijunction transistor 56. In the present instance, a trigger frequency of 480 cycles per second is selected representing four interruptions for each half-cycle of the prime source frequency to provide a waveshape such as shown in FIG. 2B at the output of secondary winding $W_5$ of step-up transformer 18. Thus, the ratio at which the prime source is modulated or switched is independent of the frequency of the relaxation oscillator which includes transistor 56.

To provide an individual gating pulse for each silicon controlled rectifier, a well-known semiconductor flip-flop circuit 57 using a pair of conventional type 2N525 transistors 64 and 66 is used. The negative output pulse developed across resistor 48 is used to trigger the flip-flop by being connected in series with a 180 ohm emitter resistor 68 in the common emitter circuit of transistors 64 and 66. A pair of 9,100 ohm bias resistors 69 and 71 are connected in the base circuit of transistors 64 and 66 which are interconnected by 9,100 ohm resistors 72 and 73 which, in turn, are shunted by 0.01 microfarad capacitors 74 and 75 to form the conventional flip-flop circuit 57. The dual output of the flip-flop is taken from a resistance divider which includes 390 ohm resistors 76 and 77, respectively, in series with 100 ohm resistors 78 and 79 in the collector circuit of transistors 64 and 66. Approximately a 15 volt square wave is provided across the collector resistors in each output leg of the flip-flop. As one or the other half of the flip-flop conducts, these alternate outputs of resistors 78 and 79 are applied, respectively, to the base of 2N1613 switching transistors 80 and 81. For example, upon conduction of transistor 64, the output of resistor 78 is applied to transistor 80, the output of which is used to apply a switching voltage by way of a 1,000 ohm load resistor 83 to the base of a type 2N3495 switching transistor 82.

When flip-flop transistor 66 conducts, an output is developed across resistor 77 which is applied to render transistor switch 81 conducting. Transistors 81 and 82 thus act as switches and conduct on alternate half-cycles to provide driving signals, respectively, to four similar type well-known isolation transformers 32 and 33 or 31 and 34 by way of four serially connected 1N914 type diodes. In particular, when flip-flop transistor 64 conducts, a voltage signal is applied to the base of transistor switch 80 initiating its conduction and driving the base of switching transistor 82 more negative to cause its conduction. The 100 ohm resistors 78, 79 and 84 are well-known drive current stabilizing resistors. Upon conduction of transistor 82, approximately 40 volts from a zener diode voltage regulation circuit 85, to be described, is applied by way of transistor 82 to a 0.1 microfarad coupling capacitor 86 and also to coupling capacitor 88. Capacitor 86 charges through the primary of isolation transformer 31 and isolation diode 94 to the 40 volt zener regulated voltage.

During charge of capacitor 86 this current flow results in a relatively sharp positive trigger pulse of approximately 10 volts in the secondary of the isolation transformer which has a step-down ratio of approximately 4 to 1. This resulting output pulse in the secondary is applied to the gate or control electrode of SCR 21 preferably by way of a well-known 22 ohm limiting resistor 89, coupling diode 98 and inverse clipping diode 99 which are added to the circuit to form a resistive diode network to provide in a well-known manner an improved load for the isolation transformer 31 and the proper polarity waveform for triggering the SCR 21. This output pulse initiates conduction of SCR 21 and current in the associated primary windings $W_1$ and $W_2$ of the step-up transformer 18, the operation of which has been previously described in detail. The trigger pulse from transistor 82 is also applied to capacitor 88, transformer 34 and SCR 24 which simultaneously receives a trigger with SCR 21 in the manner just described by way of its resistive diode network. However, in this case, only SCR 21 conducts in response to the trigger because the polarity of the anode of SCR 21 has a positive voltage with respect to its cathode. The anode of SCR 24 at this time is in the opposite polarity due to the opposite polarity of the prime power at this time and thus does not respond to the trigger. Thus, during this half-cycle of the prime power source, a first pulse is produced in the windings $W_1$ and $W_2$.

When transistor 81 conducts on the next half-cycle of the flip-flop 57, discharge current from the charged capacitor 86 now flows in the opposite direction through the primary winding of isolation transformer 33 by way of its properly poled isolation diode 96. This results in a discrete pulse applied to the control electrode or gate of SCR 23. At the same time, conduction of transistor 81 discharges capacitor 88 through the primary winding of transformer 32, applying a trigger to SCR 22, which, due to its polarity, does not conduct at this time.

The pulse applied to SCR 23 results in its conduction and in conjunction with the serially connected discharge of capacitors 44 and 46, as previously described, applies a voltage of reverse polarity in a conventional manner to cut off the presently conducting SCR switch 21 in the primary of step-up transformer 18. This process results in the reversal of voltage developed in output winding $W_5$, thus providing a first positive excursion of the wave in FIG. 2B due to the firing of SCR 21 followed by a negative excursion of the wave due to firing of SCR 23. These negative and positive excursions due to the alternate firing of SCR 21 and SCR 23 continue over the entire first half-cycle to provide four cycles of operation within the first half-cycle envelope of the prime power frequency. This cycling of SCR 21 and SCR 23 thus continues until the power source reverses and a similar cycling of SCR 24 and SCR 22 commences and continues until the end of the present prime power source cycle, thus producing a similar pattern of positive and negative excursions for second half-cycle of operation. During the alternate conduction of SCR 24 and SCR 22, no conduction of SCR 21 or SCR 23 occurs in response to their triggers since the polarity of the prime source has reversed. Thus, although trigger pulses are being applied to their respective SCR's during each interval, only the SCR which is properly poled with respect to the prime power source is affected and thus a sequence of four cycles is provided on each serially connected pair of primary windings of the transformer 18.

The operation of SCR 24 and SCR 22 on the alternate half-cycles of the prime power source is similar to the operation of SCR 21 and SCR 23. For example, when transistor 82 conducts, capacitor 88 charges through the primary of isolation transformer 34 and diode 95 to provide a trigger which causes the properly poled SCR 24 to conduct and provide a first positive excursion of the alternate half-cycle shown in FIG. 2B. SCR 22 which is properly poled to be triggered into conduction on this half-cycle then conducts in response to conduction of transistor 81 and discharge of capacitor 88 through the primary of isolation transformer 32 and diode 97. Conduction of SCR 22 causes the voltage stored in serially connected capacitors 44 and 46, previously described, to be applied across SCR 24 in a direction opposite to its prevent voltage and thus render it nonconducting. At the same time, conduction of SCR 22 also provides current flow in primary windings $W_1$ and $W_2$ and reversal of polarity in secondary winding $W_5$. Conduction of SCR 24 then cuts off SCR 22 as described. Alternate conduction of SCR 22 and SCR 24 continues until four cycles of operation within the alternate half-cycle occurs, thus completing the cycle of the power source for the selected trigger frequency. The secondary winding $W_5$ delivers a wave which, when rectified, is suited for being connected to a magnetron 39, such as a well-known QKH1635 type, and used for the aforementioned conventional heating applications. For magnetrons requiring a low ripple direct current input, a conventional filter using capacitive and inductive filtering can be added to the output of full wave rectifier 36.

It should be noted that because both charge and discharge cycles of capacitors 86 and 88 are being used to provide trigger pulses for triggering the SCR's, it is not necessary to interrupt operation during the usual recovery or charge time of the capacitor as when only a capacitor discharge is used to provide a trigger pulse. This dual operation makes possible a shorter operating time constant, the use of less capacitors and a substantially higher operating frequency capability.

Referring again to FIG. 3, zener diode voltage regulator 91 insures voltage regulation of 20 volts for the unijunction oscillator and the flip-flop circuit and zener diode regulator 90 provides in a conventional manner an additional regulated output of approximately 20 volts so that a level of 40 volts is provided for driver transistors 80, 81 and 82. Both zener diodes are fed current by way of a 1,500 ohm series limiting resistor 87 and bypassed in a well-known manner by filter capacitors 92 and 93. The zener diodes are connected in series across the input line from terminal 54 to the output side of resistor 87. Since they are constant 20-volt deivces, a constant voltage output at 20 volt and 40 volt levels occurs. For protection of driver transistors 81 and 82 a well-known shunt diode 59, such as a 1N914, is connected across the collector-emitter of transistor 81 and poled to conduct on reverse voltage transients. For protection of the switching SCR's against excessive rate of current rise, a small inductor, of a sufficient inductance to limit such current rise to the rating of the SCR's can be added in series with the transformer primary according to well-known principles and a similar inductor, not shown, can be connected in series with either capacitor 44 or 46.

Referring now to FIG. 4 there is shown a further embodiment of the invention in which the frequency of the unijunction oscillator is made to vary to compensate for changes in input or prime source voltage. In the present instance, a well-known frequency sensitive transformer of relatively high reactance is substituted for transformer 18 and used in conjunction with the four silicon controlled rectifiers of FIG. 3. The transformer windings can be separated by a conventional magnetic shunt 19 such as represented in dashed lines in connection with transformer 18 of FIG. 3 and with a high reluctance gap to provide the desired leakage reactance during operation. The frequency of the unijunction oscillator is made to vary by effectively changing the value of the potentiometer 60 and its series resistor 61 of FIG. 3. In particular, a well-known optoelectronic control device, such as a commonly used CK1122 Rayistor[R] control device 101 is use. In this device, an incandescent filament control lamp 102, of approximately 3.9 to 5.5 volts at a current rating preferably centered at 8.8 milliamperes is connected in series with a conventional current limiting resistor 104 of approximately 13,000 ohms for the present 120 volt prime source. This input circuit of the optoelectronic device 101 is connected across the prime power source at terminals 51 and 54. As the input voltage increases, the low mass filament lamp 102 glows brighter, resulting in the lowering of the resistance of a well-known photoresistive element 106 in the output circuit of the device 101. Lowering the resistance of the photoresistive element lowers the resistance across potentiometer 60 and resistor 61 and terminals A and B. In operation, the movable arm of the potentiometer 60 preferably is reset to the desired trigger frequency in the center frequency range of the high reactance output transformer at the usual values of line or prime source voltage. Departure from these values increases or decreases the value of the resistance of the photoresistive element 106 which in this instance is of a type selected to vary from 3,200 ohms to 15,000 ohms. Decreasing the resistance of element 101 in response to a greater input voltage, for example, decreases the resistance of the shunt connected potentiometer 60 and its resistor 61, thus increasing the frequency of the unijunction oscillator and in a well-known manner decreasing the output voltage of the high reactance transformer. This control circuit, for example, is intended in the present embodiment to vary the unijunction oscillator frequency range from 150 to 600 cycles per second in response to approximately a plus and minus 10 percent change in prime source voltage. Thus, in conjunction with a high reactance transformer which is selected as indicated above in a well-known manner to vary its output in response to this frequency change, the voltage applied to magnetron 39 by way of full wave rectifier 36 is maintained substantially constant in the presence of variation in line or prime source voltage.

From the above description and drawings it will be evident that a power supply circuit has been described which can be used in connection with a magnetron and minimum weight power components. It should be understood that without changes in power supply circuitry, the frequency of the input source can be reduced to any low frequency providing that its frequency is lower than the selected operating frequency of the cycle converter. This flexibility of operation permits use with substantially any available frequency of conventional power source.

The foregoing disclosure and drawings are merely illustrative of the principles of the invention and are not to be interpreted in a limiting sense. The only limitations will ke determined by the scope of the appended claims.

What is claimed is:

1. A power supply for supplying pulsed current to a load at a frequency in excess of a prime alternating current source comprising a transformer adapted to be energized by said alternating current source at a first frequency and having at least two pairs of primary windings and a secondary winding, first semiconductor switching means connected in series with each pair of said primary windings and poled to conduct current through each of said pairs of windings in one direction on half-cycles of said source, second semiconductor switching means connected in series with each of said pairs of said primary windings and poled to conduct current through each of said pairs of primary windings in a direction opposite to that of said first semiconductor switching means, means initiating conduction alternately in said first and second semiconductor switching means to initiate current flow alternately in each direction in first one pair and then the other of said pairs of said primary windings thereby to convert current flow in said secondary winding to waves having a frequency in excess of the frequency of said source, and means for progressively terminating conduction in said first and second semiconductor switching means to terminate current flow alternately in each direction through said primary windings, thereby to provide in said secondary winding an envelope formed by said waves.

2. A frequency converter circuit for producing alternating current at a frequency in excess of the frequency of an alternating current prime power source comprising a transformer having four primary windings adapted to be directly energized by an alternating current source, and a secondary winding, a semiconductor switch connected in a pair of series circuits each having a pair of primary windings and in shunt with said prime power source and adapted to conduct in a manner to control the flow of current in a single direction therethrough, means for initiating conduction at discrete intervals at a frequency in excess of that of the prime power source in each semiconductor switch which is poled in one direction a preselected number of times according to a predetermined program, and means including a capacitor charging circuit connected from one series circuit to the other series circuit for discharging to render one of said semiconductor switches nonconducting in response to conduction in another of said semiconductor switches, thereby to provide in said secondary winding alternating current pulses which upon rectification approximate characteristics achieved by rectification of said prime power source.

3. A power converter circuit for multiplying the frequency of an AC power source comprising a transformer including first and second pairs of primary windings magnetically coupled to a secondary winding, a pair of unidirectional switching means coupled back-to-back and connected in a series circuit with each pair of primary windings, each of said serially connected pairs of primary windings connected in shunt with an AC power source, means operative on a first half-cycle of said power source for initiating conduction of a first of said switching means serially connected to one of said pairs of primary windings and initiating nonconduction of a similarly poled second switching means in said other pair of primary windings, means on the second half-cycle of said AC power source for initiating conduction of a second of said switching means connected in shunt with said first switching means and nonconduction of similarly poled switching means in said second pair of primary windings, current from said AC power source during conductivity of each of said switching means coacting with said pairs of primary windings to produce in said secondary winding a series of pulses at a frequency independent of said AC power source, and rectifying means coupled to said secondary winding for converting said pulses to a direct current flow having characteristics corresponding to those achieved by rectification of said AC power source.

4. A power supply comprising a low frequency input line, a transformer having a secondary winding and four primary windings, a plurality of semiconductor switches connected in series with said primary windings and poled to interrupt current flow through said primary windings on half-cycles of said low frequency input line, a first pair of said primary windings connected in a first series circuit with each other and with a pair of back-to-back semiconductor switches and in shunt with said low frequency input line, a second pair of primary windings connected in a second series circuit with each other and with back-to-back semiconductor switches and in shunt with said low frequency input line, capacitor means connected from said first series circuit to said second series circuit and adapted to become charged in response to current flow alternately in said first and second series circuits, means in response to current flow in said second and said first series circuits to utilize the charge on said capacitor means to interrupt current flow respectively in said first and second series circuits, and timing means for progressively initiating conduction in said semiconductor switches to produce in said secondary winding a resultant current which upon rectification approximates the characteristics achieved by rectification of said low frequency input line.

5. A power supply including frequency converter circuit for producing alternating current at a frequency in excess of the frequency of a prime power source comprising a transformer having four primary windings and a secondary winding, a semiconductor switch connected in circuit with each primary winding, means for initiating conduction in each smiconductor switch at discrete intervals to program current flow through said primary windings at a frequency in excess and independent of that of said prime power source, said latter means including a capacitor charging circuit connected to discharge across one of said semiconductor switches to render said semiconductor switch nonconducting in response to conduction of another of said semiconductor switches, thereby providing in said secondary winding alternating current pulses, and means for rectifying said pulses to provide a source of unidirectional power.

6. A power supply including a frequency converter circuit for producing alternating current at a frequency in excess of the frequency of a prime power source and suitable for rectification to said original prime power frequency comprising a transformer having four primary windings and a secondary winding, means for controlling current in said primary windings comprising a silicon controlled rectifier connected in series with the primary windings and said prime power source for conducting current in said primary windings at successive time intervals, pulse generating means connected to the silicon controlled rectifiers for initiating current conduction therein, means for varying the repetition rate of the pulse generating means to a value to provide in said secondary winding alternating current pulses at a frequency in excess of that of the prime power source, and means for rectifying said pulses to provide a unidirectional power source having the approximate characteristics achieved by rectification of said prime power source.

7. A power supply including a frequency converter circuit comprising a transformer having a secondary winding and at least two pairs of magnetically coupled primary windings, a semiconductor switch connected in series with each of said primary windings and a prime power source, means for progressively triggering each of said semiconductor switches into conduction at discrete intervals to program current flow from said prime power source alternately through each pair of said primary windings at a frequency in excess and independent of that of said prime power source to produce in said secondary winding a plurality of square waves having a modulation envelope which follows the waveshape of the prime power frequency, said latter means including a capacitor charging circuit connected to discharge across one of said semiconductor switches in a first pair of primary windings to render said one of said semiconductor switches nonconducting in response to conduction of another of said semiconductor switches in a second pair of primary windings, and means to rectify said square waves to provide a direct current wave similar in character to that achieved through rectification of said prime power source.

8. A power supply as set forth in claim 6 in which the means for varying the repetition rate of the pulse generating means includes a voltage sensitive element operatively connected to said pulse generating means and a voltage sensing circuit connected in shunt with said prime power source to feed input voltage variations to said voltage sensitive element.

9. A power supply including a frequency converter circuit comprising a transformer having a secondary winding and first and second pairs of primary windings adapted to be connected to a prime power source, back-to-back semiconductor switches connected in series with each of said first and second pairs of primary windings, means for triggering said semiconductor switches which are poled in one direction a preselected number of times to provide a plurality of waves during said first half-cycle, means for triggering a preselected number of times said semiconductor switches which are poled in the opposite direction during said second half-cycle to provide a plurality of waves during said second half-cycle corresponding to the number of waves produced during said first half-cycle, and means for rectifying the waves of said first and second half-cycles to provide a direct current wave having wave characteristics equivalent to those achieved through rectification of said prime power source.

10. A power supply including a frequency converter circuit for producing alternating current at a frequency in excess of a prime power source and adapted for rectification to said original prime power frequency comprising a transformer having first and second pairs of primary windings magnetically coupled to each other and to a secondary winding, a semiconductor switch poled in a first direction connected in series with each pair of primary windings and said power source and adapted to conduct at successive intervals in a manner to control current flow therethrough in a first direction, another semiconductor switch poled in a second direction connected in series with each pair of primary windings and said power source and adapted to conduct at successive intervals in a manner to control current flow in a second direction, means for initiating conduction in each semiconductor switch in discrete intervals independent of the frequency of the prime power source and in excess of the frequency thereof to provide alternating current waves in said secondary winding, said latter means including a capacitor charge circuit connected to discharge across one of said semiconductor switches to render said one of said semiconductor switches nonconducting in response to conduction of another of said semiconductor switches, and means for rectifying said alternating current waves to provide a rectified wave approximating the characteristics achieved by rectification of said prime power source.

11. A power supply having a frequency converter circuit for producing rectified alternating current having characteristics suitable for connection to a magnetron type load and at a frequency compatible with minimum size components suited for use in a microwave oven comprising a transformer adapted to be connected to a prime power source and having a plurality of pairs of primary windings and a second winding, a rectifier connected to the secondary winding, a magnetron type load connected to the rectifier, semiconductor switches operatively connected in series with each pair of primary windings and said prime power source for conducting current through respective pairs of said primary windings at successive time intervals, a first semiconductor switch in each of said pairs of primary windings poled to permit current flow in one direction and a second semiconductor switch in each of said pairs of primary windings to permit current flow in the opposite direction, and trigger circuit means for initiating conduction in said first of said semiconductor switches which are poled in one direction a preselected number of times to provide a plurality of current waves during a first half-cycle and for initiating conduction a preselected number of times in said second of said semiconductor switches which are poled in the opposite direction during a second half-cycle to provide a plurality of current waves during said second half-cycle corresponding to the number of waves produced during said first half-cycle and at a frequency in excess of the frequency of said prime power source and independently thereof to provide in said secondary winding an envelope formed by said waves, said rectifier providing rectification of said waves to provide for said magnetron type load rectified current waves having characteristics corresponding to those achieved by rectification of said prime power source.

12. A power supply as set forth in claim 11 in which capacitors are connected in a series circuit with said semiconductor switches and adapted to provide commutation pulses in response to both charge and discharge of said capacitors.

13. A power supply as set forth in claim 11 in which said transformer is a high reactance type adapted to vary its output with variation in frequency in response to said trigger circuit means independent of the frequency of said prime power source, means for sensing for voltage variations in said prime power source, and means in response to said voltage variations to vary the frequency of output of said trigger circuit means thereby to provide a control voltage which varies the frequency of conduction of said semiconductor switches in a manner to compensate for said voltage variations.

14. A power supply for operating a magnetron including a frequency converter circuit for producing alternating current at a frequency in excess of the frequency of a prime power source comprising a transformer having a secondary winding and first and second pairs of primary windings magnetically coupled to each other and directly connected in shunt with said prime power source, semiconductor switching means connected in a series circuit with each of said primary windings and said prime power source, said semiconductor switching means poled to control current flow therethrough alternately in each direction in each pair of said semiconductor switches; means for initiating conduction alternately in the first of said pairs of windings and in the second of said pairs of windings to provide in said secondary winding first and second envelopes of alternating current pulses; capacitor means including a pair of capacitors connected in a series circuit with said first and second of said pairs of primary windings and adapted to apply a charge on both said capacitors to interrupt current flow in said first and second of said pairs of windings, means charging said capacitors in response to current flow through said first of said pairs of windings and said second of said pairs of windings, means for rectifying said pulses to provide a source of unidirectional power resembling that achieved through rectification of the prime power source, and a magnetron connected to said source of unidirectional power.

15. A power supply as set forth in claim 14 in which said transformer is a high reactance type adapted to vary its output with variation in frequency of said prime power source, means for sensing voltage variations in said prime power source, and means in response to said voltage variations to provide a control signal to vary the frequency of conduction of said semiconductor switches in a manner to compensate for said voltage variation and provide said magnetron with a substantially constant source of power.

16. A power supply including a frequency converter circuit for producing alternating current at a frequency in excess of the frequency of an alternating current power source comprising a transformer having first and second pairs of primary windings magnetically coupled to each other and to a secondary winding, a pair of semiconductor switches connected in a series circuit with each of said pairs of primary windings and said power source, each pair of semiconductor switches poled to control current flow therethrough alternately in each direction, means for alternately initiating conduction in the first of said pairs of primary windings and in the second of said pairs of primary windings to provide in said secondary winding first and second envelopes of alternating current pulses, capacitance means including a pair of capacitors connected in a series circuit with said first and second pairs of primary windings and adapted to apply a charge on both said capacitors to interrupt current flow in said first and second of said pairs of primary windings, means charging said capacitors in response to current flow through said first of said pairs of primary windings and said second of said pairs of primary windings, thereby to provide in said secondary winding an envelope containing alternating current pulses independent of the frequency of said alternating current power source, and means to rectify said pulses in said envelope to provide a source of unidirectional power having characteristics approximating those achieved by rectification of said alternating current power source.

17. A power supply as set forth in claim 16 in which said transformer is a high reactance type adapted to vary its output with variation in frequency of said alternating current power source, and means in response to voltage variations of said alternating current power source to provide a control voltage to vary the frequency of conduction of each pair of said semiconductor switches to compensate for said voltage variations.

* * * * *